(12) United States Patent
Ban

(10) Patent No.: US 10,293,508 B2
(45) Date of Patent: May 21, 2019

(54) CUTTING METHOD OF LIQUID CRYSTAL PANEL

(71) Applicant: Shenzhen China Star Optoelectronics Technology Co., Ltd., Shenzhen, Guangdong (CN)

(72) Inventor: Song Ban, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 258 days.

(21) Appl. No.: 15/110,094

(22) PCT Filed: May 20, 2016

(86) PCT No.: PCT/CN2016/082781
§ 371 (c)(1),
(2) Date: Jul. 6, 2016

(87) PCT Pub. No.: WO2017/166397
PCT Pub. Date: Oct. 5, 2017

(65) Prior Publication Data
US 2018/0164631 A1    Jun. 14, 2018

(30) Foreign Application Priority Data

Mar. 29, 2016   (CN) .......................... 2016 1 0188094

(51) Int. Cl.
*B26D 5/00*     (2006.01)
*G02F 1/1333*   (2006.01)
(Continued)

(52) U.S. Cl.
CPC ........... *B26D 5/007* (2013.01); *B26D 7/2628* (2013.01); *C03B 33/037* (2013.01); *C03B 33/07* (2013.01);
(Continued)

(58) Field of Classification Search
CPC . G02F 1/133351; G02F 1/1303; B26D 5/007; B26D 7/2628; Y10T 225/30
See application file for complete search history.

(56) References Cited

U.S. PATENT DOCUMENTS 8,098,010 B2    1/2012  Kai et al.
2003/0231277 A1* 12/2003 Zhang .................. G02F 1/1368
                                              349/187

(Continued)

FOREIGN PATENT DOCUMENTS

CN    101109860 A    1/2008
CN    101530965 A    9/2009
(Continued)

OTHER PUBLICATIONS

2nd OA of CN2016101880949.

*Primary Examiner* — Phong H Nguyen
(74) *Attorney, Agent, or Firm* — Andrew C. Cheng

(57) ABSTRACT

The present invention discloses a cutting method of a liquid crystal panel, comprising: providing a control device, an image identification device and a knife, and the substrate has respective cutting positions of the knife in a first cutting direction, and the control device is preset with cutting position information of the respective cutting positions; setting a reference alignment mark on the substrate, and the reference alignment mark is positioned between two adjacent cutting positions; capturing the reference alignment mark with the image identification device, and generating reference position information indicating the reference alignment mark; controlling the knife to move to the respective cutting positions in sequence and to cut with the control device according to the reference position information and the cutting position information. The cutting method pro- (Continued)

vided by the present invention can simplify the cutting process and raise the cutting efficiency.

13 Claims, 4 Drawing Sheets

(51) Int. Cl.
 *B26D 7/26* (2006.01)
 *G02F 1/13* (2006.01)
 *C03B 33/037* (2006.01)
 *C03B 33/07* (2006.01)

(52) U.S. Cl.
 CPC .......... *G02F 1/1303* (2013.01); *G02F 1/1333* (2013.01); *G02F 1/133351* (2013.01); *Y02P 40/57* (2015.11)

(56) References Cited

U.S. PATENT DOCUMENTS

2004/0263768 A1* 12/2004 Lee .................. G02F 1/133351
 349/158
2009/0128030 A1 5/2009 Kai et al.

FOREIGN PATENT DOCUMENTS

| CN | 101844864 A | 9/2010 |
|---|---|---|
| CN | 102390923 A | 3/2012 |
| CN | 105093614 A | 11/2015 |
| JP | 2007076671 A | 3/2007 |
| JP | 4828186 B2 | 11/2011 |

* cited by examiner

100

S110 — providing a control device, an image identification device and a knife, and the substrate has respective cutting positions of the knife in a first cutting direction, and the control device is preset with cutting position information of the respective cutting positions;

S120 — setting a reference alignment mark on the substrate, and the reference alignment mark is positioned between two adjacent cutting positions;

S130 — capturing the reference alignment mark with the image identification device, and generating reference position information indicating the reference alignment mark;

S140 — controlling the knife to move to the respective cutting positions in sequence and to cut with the control device according to the reference position information and the cutting position information

FIG. 1

CUTTING METHOD OF LIQUID CRYSTAL PANEL

CROSS REFERENCE

This application claims the priority of Chinese Patent Application No. 201610188094.9, entitled "Cutting method of liquid crystal panel", filed on Mar. 29, 2016, the disclosure of which is incorporated herein by reference in its entirety.

FIELD OF THE INVENTION

The present invention relates to a liquid crystal panel manufacture technology field, and more particularly to a cutting method of a liquid crystal panel.

BACKGROUND OF THE INVENTION

In the manufacture process of the liquid crystal panel, it is required to cut the entire substrate to divide the liquid crystal panel which meets the design dimension. All the respective liquid crystal panels to be formed on the substrate have alignment marks. The CCD (Charge Coupled Device) identifies the alignment marks and generates the cutting control information. The knife cuts according to the cutting control information. The cut part but with the knife is the waste material. In prior art, in the same cutting direction (such as in the longitudinal direction or in the transverse direction), after the knife accomplishes the first cutting, the station needs to transports the substrate forward to the position where the CCD can scan it. Then, the CCD identifies the second set of the alignment marks one more time to control the knife to continue the second cutting. Therefore, it results in that the process procedure is more, and the cutting efficiency is lowered.

SUMMARY OF THE INVENTION

An objective of the present invention is to provide a cutting method of a liquid crystal panel, which simplifies the process procedure of the original cutting process.

A cutting method of a liquid crystal panel, which is employed to cut a substrate to form the liquid crystal panel, wherein the cutting method comprises: providing a control device, an image identification device and a knife, and the substrate has respective cutting positions of the knife in a first cutting direction, and the control device is preset with cutting position information of the respective cutting positions; setting a reference alignment mark on the substrate, and the reference alignment mark is positioned between two adjacent cutting positions; capturing the reference alignment mark with the image identification device, and generating reference position information indicating the reference alignment mark; controlling the knife to move to the respective cutting positions in sequence and to cut with the control device according to the reference position information and the cutting position information.

The step of controlling the knife to move to the respective cutting positions in sequence and cutting with the control device according to the reference position information and the cutting position information comprises: determining respective distance values among the reference alignment mark and the respective cutting positions to the respective cutting positions with the control device according to the reference position information and the cutting position information; controlling the knife to move to the respective cutting positions corresponded with the respective distance values in sequence and to cut with the control device according to the respective distance values.

The substrate comprises an upper substrate and a lower substrate, and the knife comprises a first knife and a second knife, and the first knife is employed to cut the upper substrate, and the upper substrate has a first cutting position and a second cutting position of the first knife in the first cutting direction, and the second knife is employed to cut the lower substrate, and the lower substrate has a third cutting position and a fourth cutting position of the second knife in the first cutting direction, and the control device is preset with cutting position information indicating the first cutting position, the second cutting position, the third cutting position and the fourth cutting position.

The reference alignment mark comprises a first reference alignment mark and a second reference alignment mark, and the first reference alignment mark is positioned between the first cutting position and the second cutting position, and the second reference alignment mark is positioned between the third cutting position and the fourth cutting position.

The step of capturing the reference alignment mark with the image identification device, and generating reference position information indicating the reference alignment mark comprises: capturing the first reference alignment mark and the second reference alignment mark with the image identification device, and generating first reference position information indicating the first reference alignment mark and second reference position information indicating the second reference alignment mark.

The step of determining respective distance values among the reference alignment mark and the respective cutting positions to the respective cutting positions with the control device according to the reference position information and the cutting position information comprises: determining a first distance value between the first reference alignment mark and the first cutting position, and a second distance value between the first reference alignment mark and the second cutting position with the control device according to the first reference position information and the cutting position information; determining a third distance value between the second reference alignment mark and the third cutting position, and a fourth distance value between the second reference alignment mark and the fourth cutting position with the control device according to the second reference position information and the cutting position information.

The step of controlling the knife to move to the respective cutting positions corresponded with the respective distance values in sequence and to cut with the control device according to the respective distance values comprises: controlling the first knife to move to the first cutting position corresponded with the first distance value and the second cutting position corresponded with the second distance value in sequence and cutting with the control device according to the first distance value and the second distance value; controlling the second knife to move to the third cutting position corresponded with the third distance value and the fourth cutting position corresponded with the fourth distance value in sequence and to cut with the control device according to the third distance value and the fourth distance value.

Both the first reference alignment mark and the second reference alignment mark comprise two alignment marks, and a connection line of the two alignment marks is parallel with the first cutting position.

The first knife and the second knife have a movement limit value, and all the first distance value, the second distance value, the third distance value and the fourth distance value are smaller than or equal to the movement limit value.

The movement limit value is 19 mm.

Therefore, in the cutting method of this embodiment, by setting the first alignment mark and the second alignment mark respectively on the upper substrate and the lower substrate, the image identification device only needs capturing the first alignment mark and the second alignment mark in one time, and the control module can determine the two movement distances of the first knife from the first alignment mark to the two cutting positions, and can determine the two movement distances of the second knife from the second alignment mark to the cutting positions; the control device can respectively control the first knife and the second knife to accomplish the respective two times cuttings according to the aforesaid movement distances; and after accomplishing the former cutting, the first knife and the second knife directly move to the positions of next cuttings and continue to cut. In comparison with prior art, one station substrate delivery process and one alignment mark identification process are saved, and thus to simplify the cutting art and to raise the cutting efficiency.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

FIG. 1 is a schematic flow chart of a cutting method of a liquid crystal panel according to the embodiment of the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The cutting apparatus in this embodiment is a Non-Cross Type cutter (not shown). In other embodiments, the cutter of other types also can be utilized.

As shown in FIG. 1, a cutting method 100 of a liquid crystal panel according to this embodiment comprises:

S110, providing a control device, an image identification device and a knife, and the substrate has respective cutting positions of the knife in a first cutting direction, and the control device is preset with cutting position information of the respective cutting positions;

S120, setting a reference alignment mark on the substrate, and the reference alignment mark is positioned between two adjacent cutting positions;

S130, capturing the reference alignment mark with the image identification device, and generating reference position information indicating the reference alignment mark;

S140, controlling the knife to move to the respective cutting positions in sequence and to cut with the control device according to the reference position information and the cutting position information.

Figure 2:
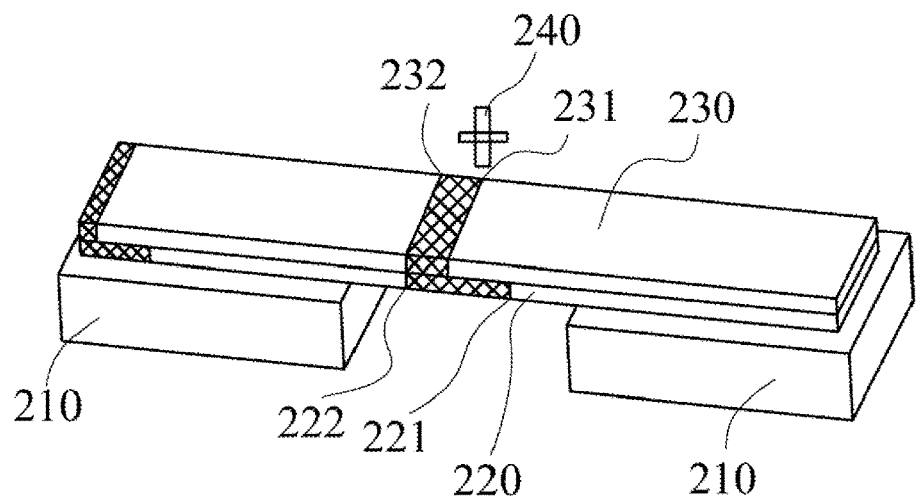
FIG. 2 is a cutting operation diagram of the cutting method according to the embodiment of the present invention.

Specifically, as shown in FIG. 1 and FIG. 2, in S110, the cutter comprises a station 210, and a substrate is positioned on the station 210. The substrate comprises a lower substrate 220 and an upper substrate 230. The lower substrate 220 comprises a plurality of color filter units, and the upper substrate 230 comprises a plurality of thin film transistor array units. In other embodiment, it is an option that the substrate with color filter units is at the top and the substrate with the thin film transistor array units is at the bottom. In this embodiment, the shadow portions of the lower substrate 220 and the upper substrate 230 are waste material which will be cut and removed by the knife. The cutter comprises a control device (not shown in figure), an image identification device 240, a first knife 250 and a second knife 260. The first knife 250 is employed to cut the upper substrate 230 to form a thin film transistor array substrate. The second knife 260 is employed to cut the lower substrate 220 to form a color filter substrate. The upper substrate 230 and the lower substrate 220 respectively have respective cutting positions of the first knife 250 and the second knife 260 in the first cutting direction. In this embodiment, as shown in FIG. 2, the first cutting direction is the longitudinal direction of the upper substrate 230 or the lower substrate 220. Certainly, in other embodiments, the first cutting direction can be the transverse direction of the upper substrate or the lower substrate. The control device is preset with cutting position information indicating the respective cutting positions of the first knife 250 and the second knife 260. In this embodiment, the image identification device 240 is preferably to be a CCD. The CCD possesses advantages of fast image capturing speed and high identification accuracy. In other embodiments, the image identification device 240 of other types also can be employed.

Figure 3:
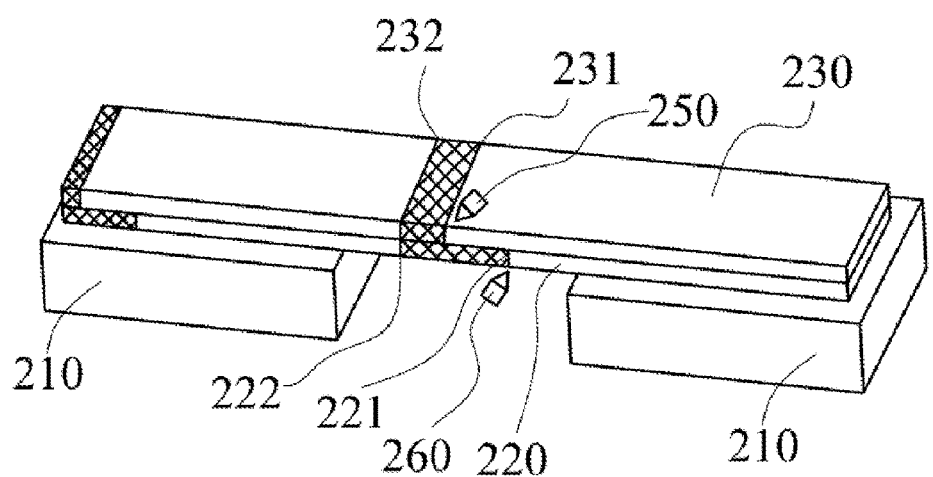
FIG. 3 is another cutting operation diagram of the cutting method according to the embodiment of the present invention.
Figure 4:
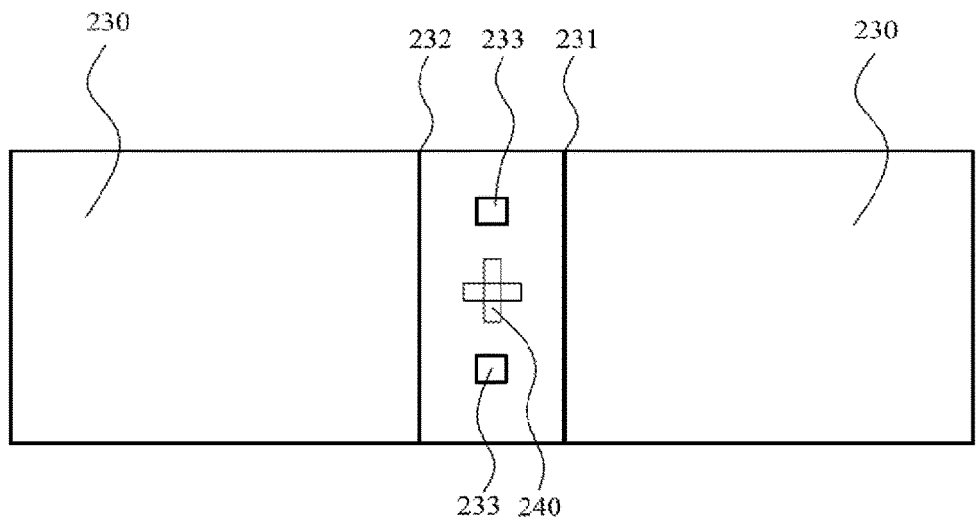
FIG. 4 is another cutting operation diagram of the cutting method according to the embodiment of the present invention.
Figure 5:
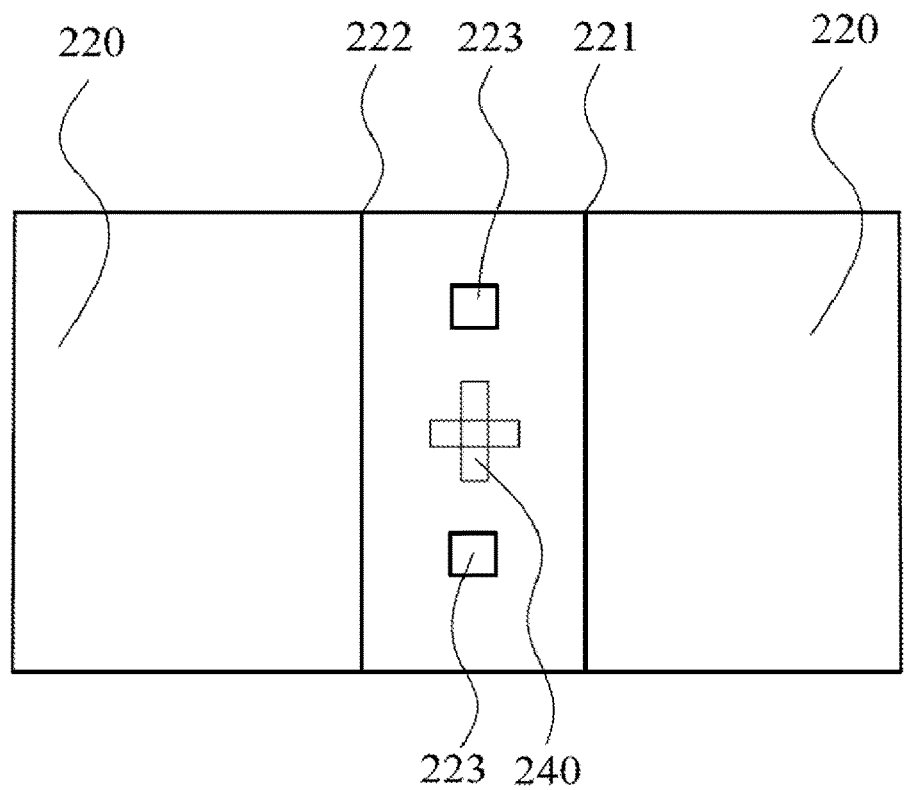
FIG. 5 is another cutting operation diagram of the cutting method according to the embodiment of the present invention.
Figure 6:
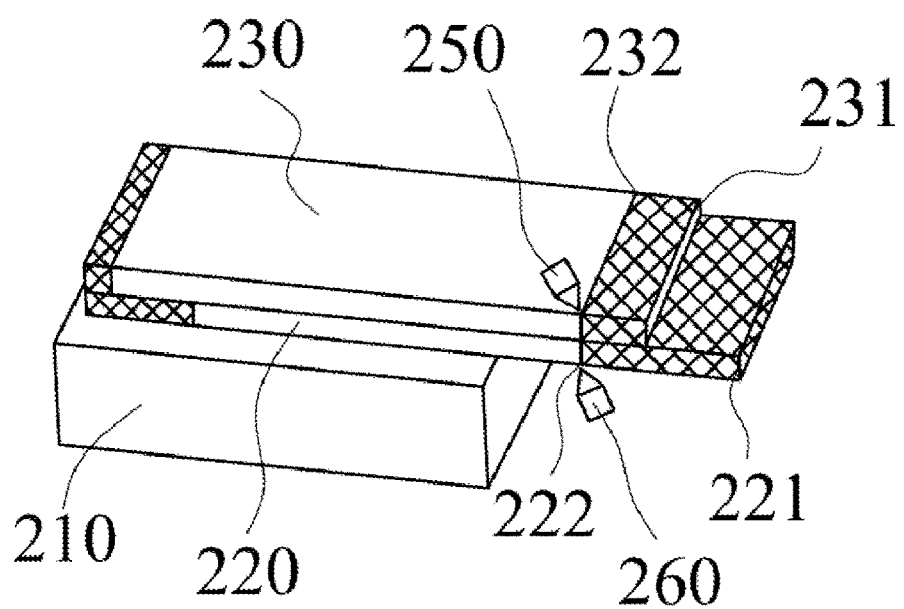
FIG. 6 is another cutting operation diagram of the cutting method according to the embodiment of the present invention.

In S120, a reference alignment mark is set on the substrate so that the reference alignment mark is positioned between two adjacent cutting positions. Specifically, as shown in FIG. 3, the upper substrate 230 has a first cutting position 231 and a second cutting position 232 which are adjacent. A first reference alignment mark 233 is provided on the upper substrate 230 so that the first reference alignment mark 233 is between the first cutting position 231 and the second cutting position 232. As shown in FIG. 4, the lower substrate 220 has a third cutting position 221 and a fourth cutting position 222 which are adjacent. A second reference alignment mark 223 is provided on the lower substrate 220 so that the second reference alignment mark 223 is between the first cutting position 221 and the second cutting position 222.

Both the first reference alignment mark 233 and the second reference alignment mark 223 comprise two alignment marks, and a connection line of the two alignment marks is parallel with the first cutting position. In other embodiments, the alignment mark amount of the first reference alignment mark 233 or the second reference alignment mark 223 is determined according to the specific design requirement. The first reference alignment mark 233 and the second reference alignment mark 223 are right oppositely located. Namely, the projection position of the first reference alignment mark 233 on the lower substrate 220 coincides with the second reference alignment mark 223. In this embodiment, only that the knife cuts in the first cutting direction, i.e. cuts the upper substrate 230 and the lower substrate 220 is illustrated for explanation. Therefore, merely the two aforesaid cutting positions of the first knife 250 and the second knife 260 are described. In the practical cutting process, the knife continuously cuts in the longitudinal direction and the transverse direction of the substrate according to the cutting method 100 of this embodiment.

In S130, the image identification device 240 captures the reference alignment mark, and generates reference position information indicating the reference alignment mark. Specifically, the station 210 moves the substrate so that the both the first reference alignment mark 233 and the second reference alignment mark 223 are in the area, which the image identification device 240 can scan. As shown in FIG. 3 and FIG. 4, the image identification device 240 captures the first reference alignment mark 233 once, and respectively generates first reference position information indicating the first reference alignment mark 233, and second reference position information indicating the second reference alignment mark 223.

In S140, controlling the first knife 250 to move to the first cutting position 231 and the second cutting position 232 in sequence and to cut, and controlling the second knife 260 to move to the third cutting position 221 and the fourth cutting position 222 in sequence and to cut with the control device according to the first reference position information, the second reference position information, which are generated by the image identification device 240 and the cutting position information preset in the control device. Specifically, as shown in FIG. 3, the control device determines a first distance value between the first reference alignment mark 233 and the first cutting position 231 and a second distance value between the first reference alignment mark 233 and the second cutting position 232 according to the first reference position information and the cutting position information. Then, the control device controls the first knife 250 to move to the first cutting position 231 corresponded with the first distance value according to the first distance value, and then the first knife 250 executes the cutting operation. After the first cutting at the first cutting position 231 is accomplished, the control device controls the first knife 250 to directly shift from the first cutting position 231 to the second cutting position 232 according to the second distance value, and then the first knife 250 executes the second cutting operation. Correspondingly, as shown in FIG. 4, the control device determines a third distance value between the second reference alignment mark 223 and the third cutting position 221 and a fourth distance value between the second reference alignment mark 223 and the fourth cutting position 222 according to the second reference position information and the cutting position information. Then, the control device controls the second knife 260 to move to the third cutting position 221 corresponded with the third distance value according to the third distance value, and then the second knife 260 executes the cutting operation. After the first cutting at the third cutting position 221 is accomplished, the control device controls the second knife 260 to directly shift from the third cutting position 221 to the fourth cutting position 222 according to the fourth distance value, and then the second knife 260 executes the second cutting operation.

The first knife 250 and the second knife 260 have the movement limit value. The movement limit value is an one way maximum stroke of shifting from the first reference alignment mark 233 or the second reference alignment mark 223 to the cutting position in the first cutting direction which the first knife 250 or the second knife 260 are perpendicular with, i.e. in the transverse direction of the substrate in this embodiment. In this embodiment, the movement limit value is 19 mm. In other embodiments, the movement limit value is determined according to the specific cutting art. For the first knife 250, as executing the first cutting, the transverse movement distance from the first reference alignment mark 233 to the first cutting position 231 should be smaller than or equal to 19 mm, i.e. the first distance should be smaller than or equal to 19 mm; as executing the second cutting, the first knife 250 transversely shifts from the first cutting position 231, and passes through the first reference alignment mark 233, and finally moves to the second cutting position 232. Similarly, the transverse movement distance from the first reference alignment mark 233 to the second cutting position 232 also should be smaller than or equal to 19 mm, i.e. the second distance also should be smaller than or equal to 19 mm. Namely, the distance between the first cutting position 231 and the second cutting position 232 should be smaller than or equal to 2*19 mm. In the practical manufacture process of the liquid crystal panel, with the consideration of saving material and raising the production capability, the design of the first alignment mark 233 and the adjacent cutting positions on the substrate 230 can satisfies the requirement of the movement limit value. Thus, the first knife 250 can shift in the movement limit value and then accomplish the cutting operation. For the second knife 260, similarly, both the third distance and the fourth distance are smaller than or equal to 19 mm. The distance between the third cutting position 221 and the fourth cutting position 222 is smaller than or equal to 2*19 mm.

Therefore, in the cutting method of this embodiment, by setting the first alignment mark and the second alignment mark respectively on the upper substrate and the lower substrate, the image identification device only needs capturing the first alignment mark and the second alignment mark in one time, and the control module can determine the two movement distances of the first knife from the first alignment mark to the two cutting positions, and can determine the two movement distances of the second knife from the second alignment mark to the cutting positions; the control device can respectively control the first knife and the second knife to accomplish the respective two times cuttings according to the aforesaid movement distances; and after accomplishing the former cutting, the first knife and the second knife directly move to the positions of next cuttings and continue to cut. In comparison with prior art, one station substrate delivery process and one alignment mark identification process are saved, and thus to simplify the cutting art and to raise the cutting efficiency.

The foregoing descriptions are merely the specific embodiments of the present invention. However, the present invention is not limited thereby. Any modifications, equivalent replacements or improvements within the spirit and principles of the embodiment described above, which can be easily derived by those skilled persons in this art from the technical field disclosed in the present invention should be covered by the protected scope of the invention. Thus, the patent protection scope of the present invention should be subjected to what is claimed is.

What is claimed is:

1. A cutting method of a liquid crystal panel, which is employed to cut a substrate having an upper substrate and a lower substrate to form the liquid crystal panel, wherein the cutting method comprises:

providing a control device, an image identification device and a knife having a first knife and a second knife, and the substrate has respective cutting positions of the knife in a first cutting direction, and the control device is preset with cutting position information of the respective cutting positions;

setting a reference alignment mark on the substrate, and the reference alignment mark is positioned between two adjacent cutting positions, wherein the reference alignment mark comprises a first reference alignment mark and a second reference alignment mark, and the first reference alignment mark is positioned on the upper substrate and the second reference alignment mark is positioned on the lower substrate, wherein a projection position of the first reference alignment mark on the lower substrate coincides with the second reference alignment mark;

capturing the first reference alignment mark and the second reference alignment mark with the image identification device only in one time, and generating reference position information indicating the reference alignment mark;

controlling the first knife to cut the upper substrate and the second knife to cut the lower substrate to move to the respective cutting positions in sequence and to cut with the control device according to the reference position information and the cutting position information by only capturing the first reference alignment mark and the second reference alignment mark in the one time.

2. The cutting method according to claim 1, wherein the step of controlling the knife to move to the respective cutting positions in sequence and to cut with the control device according to the reference position information and the cutting position information comprises:

determining respective distance values among the reference alignment mark and the respective cutting positions to the respective cutting positions with the control device according to the reference position information and the cutting position information;

controlling the knife to move to the respective cutting positions corresponded with the respective distance values in sequence and to cut with the control device according to the respective distance values.

3. The cutting method according to claim 2, wherein the upper substrate has a first cutting position and a second cutting position of the first knife in the first cutting direction, and the lower substrate has a third cutting position and a fourth cutting position of the second knife in the first cutting direction, and the control device is preset with cutting position information indicating the first cutting position, the second cutting position, the third cutting position and the fourth cutting position.

4. The cutting method according to claim 3, wherein the first reference alignment mark is positioned between the first cutting position and the second cutting position, and the second reference alignment mark is positioned between the third cutting position and the fourth cutting position.

5. The cutting method according to claim 4, wherein the step of capturing the reference alignment mark with the image identification device, and generating reference position information indicating the reference alignment mark comprises:

capturing the first reference alignment mark and the second reference alignment mark with the image identification device, and generating first reference position information indicating the first reference alignment mark and second reference position information indicating the second reference alignment mark.

6. The cutting method according to claim 5, wherein the step of determining respective distance values among the reference alignment mark and the respective cutting positions to the respective cutting positions with the control device according to the reference position information and the cutting position information comprises:

determining a first distance value between the first reference alignment mark and the first cutting position, and a second distance value between the first reference alignment mark and the second cutting position with the control device according to the first reference position information and the cutting position information; determining a third distance value between the second reference alignment mark and the third cutting position, and a fourth distance value between the second reference alignment mark and the fourth cutting position with the control device according to the second reference position information and the cutting position information.

7. The cutting method according to claim 6, wherein the step of controlling the knife to move to the respective cutting positions corresponded with the respective distance values in sequence and to cut with the control device according to the respective distance values comprises:

controlling the first knife to move to the first cutting position corresponded with the first distance value and the second cutting position corresponded with the second distance value in sequence and cutting with the control device according to the first distance value and the second distance value; controlling the second knife to move to the third cutting position corresponded with the third distance value and the fourth cutting position corresponded with the fourth distance value in sequence and to cut with the control device according to the third distance value and the fourth distance value.

8. The cutting method according to claim 7, wherein both the first reference alignment mark and the second reference alignment mark comprise two alignment marks, and a connection line of the two alignment marks is parallel with the first cutting position.

9. The cutting method according to claim 6, wherein both the first reference alignment mark and the second reference alignment mark comprise two alignment marks, and a connection line of the two alignment marks is parallel with the first cutting position.

10. The cutting method according to claim 6, wherein the first knife and the second knife have a movement limit value, and all the first distance value, the second distance value, the third distance value and the fourth distance value are smaller than or equal to the movement limit value.

11. The cutting method according to claim 10, wherein the movement limit value is 19 mm.

12. The cutting method according to claim 4, wherein both the first reference alignment mark and the second reference alignment mark comprise two alignment marks, and a connection line of the two alignment marks is parallel with the first cutting position.

13. The cutting method according to claim 5, wherein both the first reference alignment mark and the second reference alignment mark comprise two alignment marks, and a connection line of the two alignment marks is parallel with the first cutting position.

\* \* \* \* \*